(12) United States Patent
Miyazawa et al.

(10) Patent No.: US 7,704,175 B2
(45) Date of Patent: Apr. 27, 2010

(54) LINK PLATE FOR ROLLER CHAIN AND MANUFACTURING METHOD THEREOF

(75) Inventors: Toshihiko Miyazawa, Osaka (JP); Toshifumi Satoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 272 days.

(21) Appl. No.: 11/520,323

(22) Filed: Sep. 13, 2006

(65) Prior Publication Data

US 2007/0093333 A1   Apr. 26, 2007

(30) Foreign Application Priority Data

Oct. 21, 2005   (JP)   ............... 2005-307451

(51) Int. Cl.
*F16G 13/02* (2006.01)
*F16G 13/04* (2006.01)
(52) U.S. Cl. ............... 474/231; 474/230; 474/212
(58) Field of Classification Search ............... 474/231, 474/230, 212
See application file for complete search history.

(56) References Cited

U.S. PATENT DOCUMENTS

| | | | | |
|---|---|---|---|---|
| 1,694,746 A | * | 12/1928 | Landahl | 198/851 |
| 2,182,443 A | * | 12/1939 | McAninch | 474/231 |
| 2,212,907 A | * | 8/1940 | Weiss | 474/231 |
| 3,581,589 A | * | 6/1971 | Resener | 474/231 |
| 4,037,403 A | * | 7/1977 | Lanz et al. | 59/8 |
| 2004/0261393 A1 | * | 12/2004 | Sato et al. | 59/8 |

FOREIGN PATENT DOCUMENTS

| | | |
|---|---|---|
| JP | 09-217796 | 8/1997 |
| JP | 2002266951 A * | 9/2002 |

\* cited by examiner

*Primary Examiner*—Bradley T King
*Assistant Examiner*—Mahbubur Rashid
(74) *Attorney, Agent, or Firm*—Dann, Dorfman, Herrell and Skillman, P.C.; Henry H. Skillman

(57) ABSTRACT

A method of manufacturing a link plate for a roller chain, and the resulting link plate in which (1) the link plate has a shape comprising a pair of right and left pin holes, a pair of right and left half arcs, which are spaced outwardly from the pin holes respectively, and a pair of upper and lower straight line portions connecting both ends of the pair of right and left half arcs. There are shaved lengths along the pair of upper and lower straight line portions extending into the half arcs, the shaved length extending between the outermost positions of both ends of said pin holes.

2 Claims, 10 Drawing Sheets

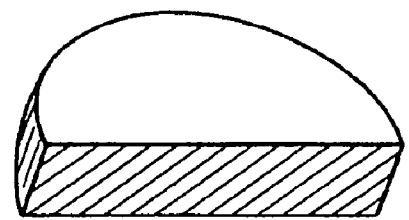
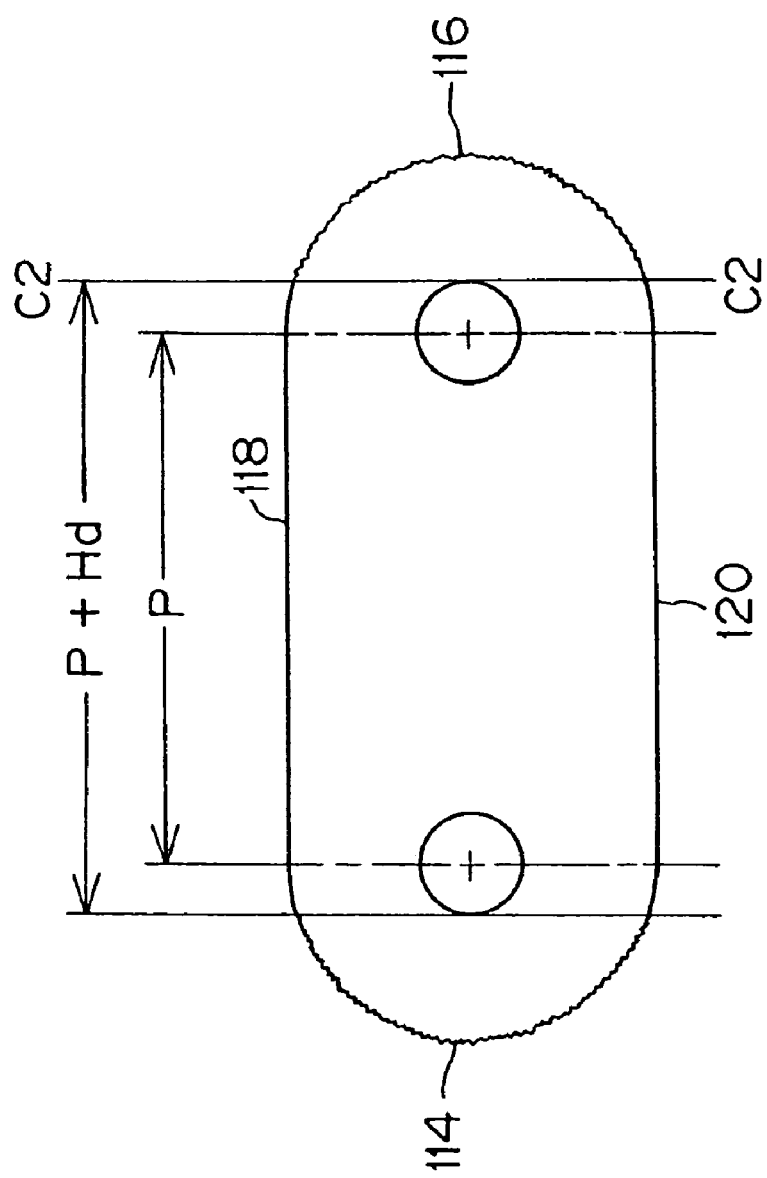

US 7,704,175 B2

LINK PLATE FOR ROLLER CHAIN AND MANUFACTURING METHOD THEREOF

FIELD OF INVENTION

The present invention relates to a roller chain, and more specifically relates to a link plate forming a roller chain used in a timing drive system in an internal-combustion engine and the manufacturing method thereof.

BACKGROUND OF THE INVENTION

As a link plate forming a roller chain used in a timing drive system in an internal combustion engine and a manufacturing method thereof, for example an invention shown in FIGS. 5 and 6 has been developed by the present inventors (see Japanese published application No. JP2005-021911). It is noted that FIG. 6 is an enlarged view of a working region shown by VI in FIG. 5.

Namely, as shown in FIG. 5, a band-shaped steel plate (sheet) H drawn out of a supply roll is intermittently, sequentially fed into a link plate punching metal mold D based on pilot holes R. Then a pair of pin holes 510 and 512 are first punched on the center line of the band-shaped steel plate H by pin-rough punching molds d4. Then as shown in FIG. 6 in detail, while leaving cutting margins K at both longitudinal ends of a link plate 500, see FIG. 5(a), the link plate 500 is punched by a plate rough-punching working mold d5 of a shape having a pair of semicircular end portions forming left and right half arcs 514 and 516, see FIG. 5(b), which are concentric with and spaced outwardly from the pin holes 510 and 512 respectively, and a pair of upper and lower straight line portions 518 and 520 connecting both end portions at the opposite ends of the pair of left and right half arcs 514 and 516.

When rough-punching is performed, a rough surface is produced having a "sag" along the edge of the work piece where the punch first meets the workpiece (This shown in an exaggerated form in FIG. 8(a) at 10.), and/or travel of the punch below the sag 10 produces a rupture rough surface 20 (shown in exaggerated form in FIG. 4(b) at 116), and/or where the punch passes beyond the work piece, a burr 30 can be generated on worked cross-sections as shown in FIG. 8(a). Accordingly, by using a plate shaving mold S4 of a shape, which is slightly larger than a contour of the plate rough-punching mold d5, as shown in FIG. 6, outer peripheries of the roughly-punched link plate is subjected to shaving so that roughly punched surfaces are slightly shaved down to obtain smooth sheared surfaces (shaved surfaces) 40 as shown in FIG. 8(b). In FIG. 8(b) an object shown by the reference numeral 50 denotes a shaved scrap. It is noted that although in FIGS. 8(a) and 8(b) the shaved surface and roughly punched surface are exaggeratedly depicted, the shaved thickness DS is actually about 0.1 mm.

It is noted that "the shaving" in the present invention means a fabrication (secondary processing) in which by the use of a shaving mold having a contour slightly larger than a contour of the peripheral portion of a punched plate. By punching a band-shaped steel plate with a working mold (generally called a "punch") during rough punching referred to as primary processing as shown in FIG. 8(a) the peripheral portion of the band-shaped steel plate to be punched is punched to shave small amount of peripheral portions of the punched plate as shown in FIG. 8(b) so that any sag 10, rupture rough surface 20 and burr 30 generated during the rough punching with the punch are removed to improve the surface roughness and surface accuracy of the roughly punched peripheral portions.

Next, the inner circumferential surfaces of the pin holes 510 and 512 are subjected to shaving by shaving molds S3 (FIG. 5). And finally cutting margins are cut with a roughly punching mold d6 to complete a link plate 500 (see for example Japanese Laid-Open Patent Publication No. 2005-21911 (pages 5 to 7, FIGS. 2 and 3)).

Further, a less expensive plate shaving mold has been also proposed, and is shown at S5 in FIG. 7. Since a tensioner lever or a guide lever comes into sliding contact with the plate, shaving of only the pair of upper and lower straight line portions of a link plate are subjected to shaving for smoothness.

PROBLEMS TO BE SOLVED BY THE INVENTION

However, in a manufacturing method of a conventional link plate for a roller chain as shown in the above-mentioned FIGS. 5 to 7, since a roughly punched region and a shaved region have not been considered specifically, the following problems have been pointed out.

First, a front end of a plate-shaving mold comes into contact with a corner of a band-shaped steel plate left as a cutting margin and the plate shaving mold can be chipped off. Thus it has been feared that the service life of the mold is shortened. Second, when a plate shaving mold is changed to a working mold by which only a pair of upper and lower straight line portions of the link plate are shaved, a warp is generated at a boundary line (C1-C1 line in FIG. 4(a)) between the shaved surface and the roughly punched surface of the link plate and it creates a problem that the link plate is liable to break. Warp, caused by the shaving machine when the link plate is shaved, causes the link plate to lose its flat shape, so the quality of the plate declines. Such warp results from a plastic deformation which occurs on an imaginary line which coincides with the boundary line, and reduces the strength of the link along the line. Third, since an expensive shaving mold, which is required for high surface roughness and surface accuracy, and an inexpensive roughly punching mold, which is not required for high accuracy have substantially the same shape, the manufacturing of the shaving mold involve high cost, which was a reason for an increase in the manufacturing costs of a roller chain.

Accordingly, the object of the present invention is to solve the above-mentioned prior art problems or to provide a manufacturing method of a link plate for a roller chain, and to provide a link plate manufactured by the manufacturing method in which (1) the life of a plate shaving mold is increased, (2) warp of the link plate is suppressed so that the life of the link plate itself is increased and (3) a further cost reduction of the plate shaving mold is made and the manufacturing costs of the roller chain is kept at a low level.

MEANS FOR SOLVING THE PROBLEMS

The present invention attains the above-mentioned objects by a link plate for a roller chain obtained by shaving a peripheral portion of a roughly punched link plate roughly punched after intermittently, sequentially feeding a band-shaped steel plate to a series of link plate molds consisting of different working molds characterized in that said link plate has a shape comprising a pair of right and left pin holes, a pair of right and left half arcs, which are spaced outwardly from said pin holes respectively, and a pair of upper and lower straight line portions connecting both ends of the pair of right and left half arcs, and that a working range for said shaving in said link plate is defined as the length along said pair of upper and lower straight line portions and said half arcs between the outermost positions of both ends of said pin holes.

Further, the present invention attains the above-mentioned objects by a manufacturing method of a link plate for a roller chain comprising the steps of intermittently, sequentially feeding a band-shaped steel plate to a series of link plate molds consisting of different working molds, roughly punching said steel plate into a link plate and shaving a peripheral portion of a roughly punched link plate, characterized in that said link plate is obtained by said roughly punching into a shape comprising a pair of right and left pin holes, a pair of right and left half arcs, which are spaced outwardly from said pin holes 5 respectively, and a pair of upper and lower straight line portions connecting both ends of the pair of right and left half arcs, and that a working range for said shaving in said link plate is defined as the length along said pair of upper and lower straight line portions and said half arcs between the outermost positions of both ends of said pin holes.

EFFECTS OF THE INVENTION

According to the invention, since in a link plate for a roller chain obtained by shaving a peripheral portion of a roughly punched link plate roughly punched after intermittently, sequentially feeding a band-shaped steel plate to a series of link plate molds consisting of different working molds, said link plate has a shape comprising a pair of right and left pin holes, a pair of right and left half arcs, which are spaced outwardly from said pin holes 5 respectively, and a pair of upper and lower straight line portions connecting both ends of the pair of right and left half arc The working range for said shaving in said link plate is defined as the length along said pair of upper and lower straight line portions and beyond, into said half arcs, so that the imaginary lines between the terminals of the shaved portions pass tangent to the outermost sides of said pin holes. As a result (1) the life of a plate shaving mold is increased, (2) warp of the link plate is suppressed so that the life of the link plate itself is increased and (3) a further cost reduction of the plate shaving mold is made.

BRIEF DESCRIPTION OF THE DRAWINGS

FIG. 4(*b*) shows a link plate for a roller chain according to the present invention;

FIG. 4(*c*) is a detached perspective view of the end portion of the link plate beyond the line C1-C1 in FIG. 4(*a*);

FIG. 4(*d*) is a detached perspective view of the end portion of the link plate beyond the line C2-C2 in FIG. 4(*b*);

FIG. 5(*a*) is a view of the link plate punched by the method shown in FIG. 5;

FIG. 5(*b*) is an enlarged view of the link plate shown in FIG. 5(*a*);

FIG. 8(*b*) is an explanatory view of the blank in FIG. 8(*a*) which has been subjected to shaving.

BEST MODE FOR CARRYING OUT THE INVENTION

The present invention will be described with reference to drawings hereinbelow.

Figure 1:
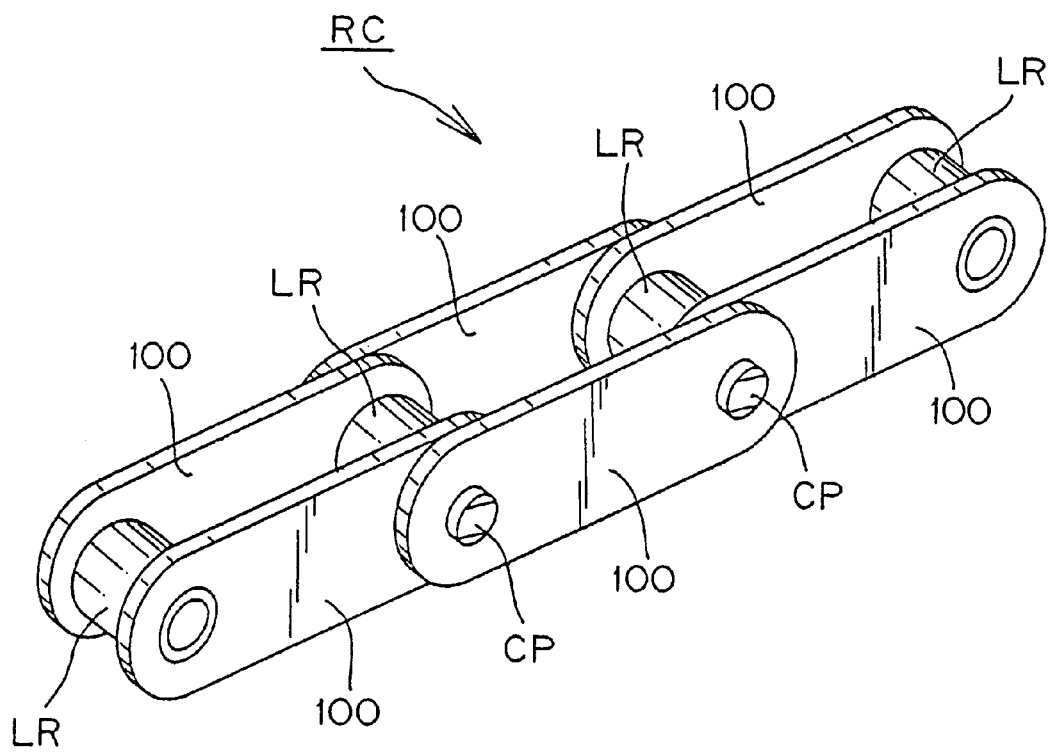
FIG. 1 is a perspective view of a roller chain in accordance with the present invention.

FIG. 1 is a perspective view partially fragmentarily showing a roller chain RC formed according to the present invention in which a number of link plates 100 for a roller chain are endlessly connected to each other by pins CP and rollers LR in a longitudinal direction of the chain.

Figure 2:
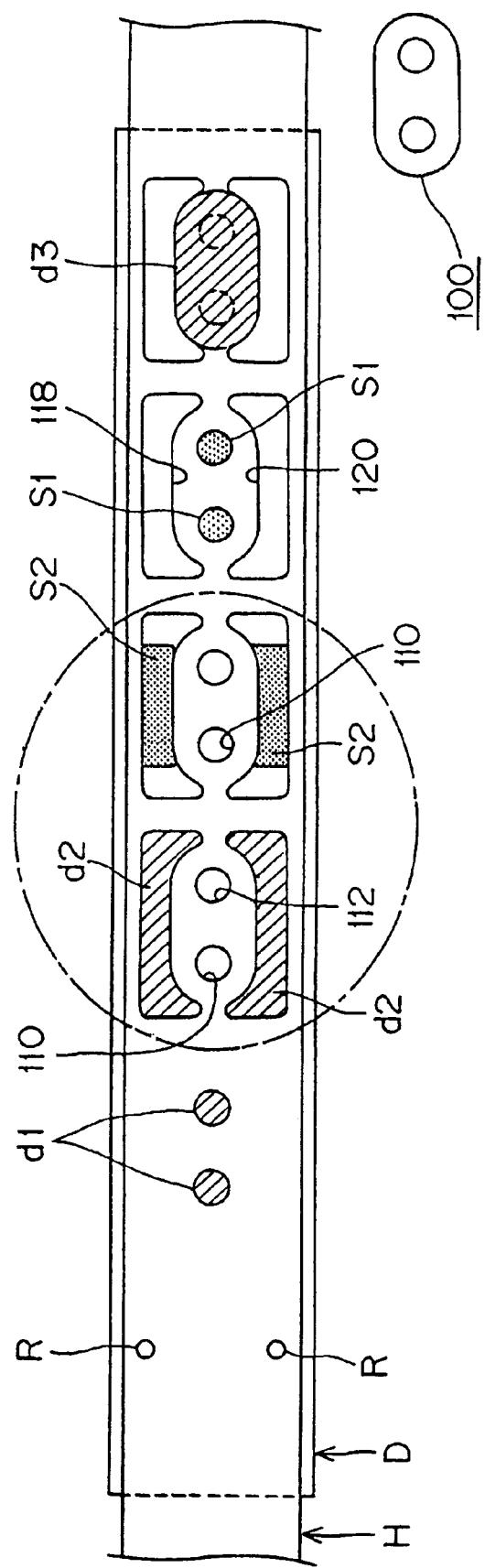
FIG. 2 is a view explaining a manufacturing method of a link plate for a roller chain according to the present invention.
Figure 3:
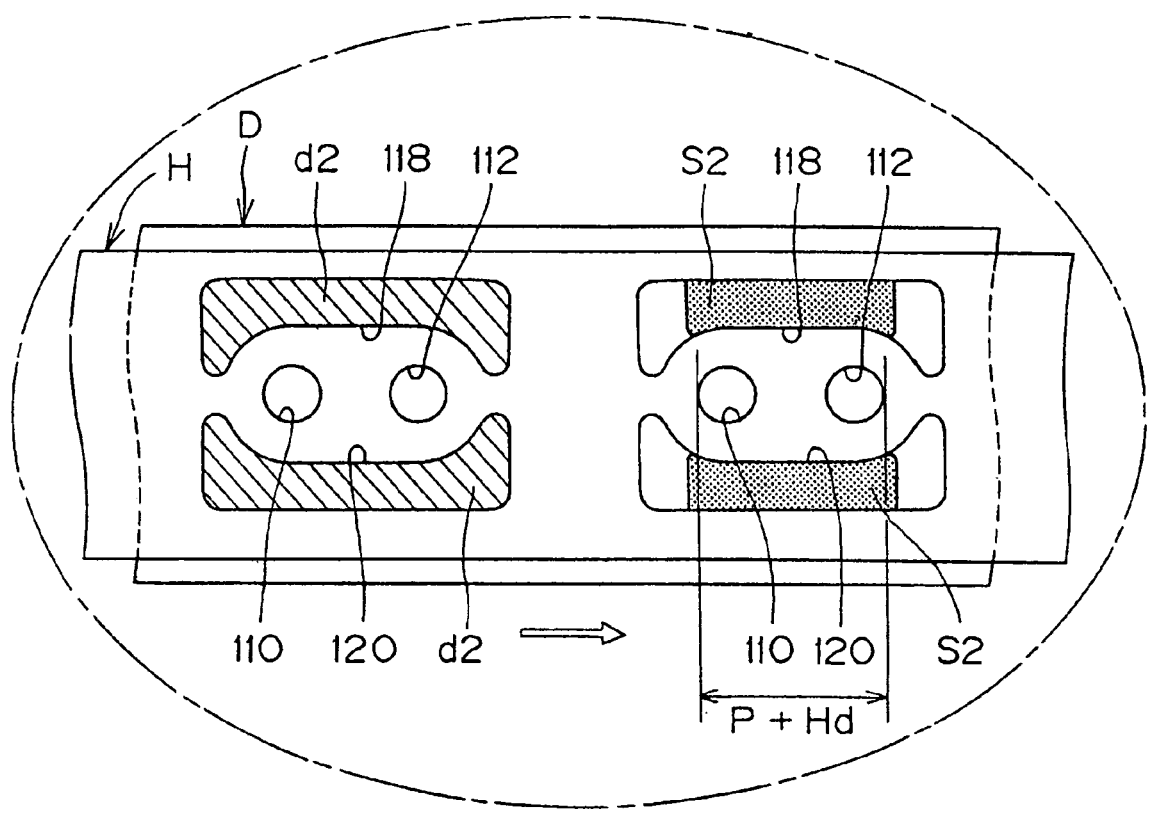
FIG. 3 is an enlarged view of a working region shown within the broken line III in FIG. 2.

As shown in FIGS. 2 and 3, the link plate 100 for the roller chain of the present example includes a basic structure comprising pin holes 110 and 112, plate side surfaces 118 and 120. In the present example, a band-shaped steel plate (sheet) H is intermittently, sequentially fed to a series of link plate punching mold D including pin roughly punching molds d1, which form inner surfaces of pin holes 110 and 112 and plate roughly punching molds d2, which form the rear plates 118 and 120 of the plate and the link 100 is roughly punched by the pin roughly punching molds d1 and the plate roughly punching molds d2. After that the punched steel plate is subjected to shaving by working molds corresponding to the plate roughly punching molds d2, that is plate shaving molds S2 having a contour slightly larger than that of the link plate obtained by roughly punching. Then inner circumferential surfaces of the roughly punched pin holes 110 and 112 are subjected to shaving by working molds corresponding to the pin roughly punching molds d1 that is pin shaving molds S1 having a diameter slightly larger than that of the punched pin hole.

In this case the plate shaving mold S2 has not the same shape as the plate roughly punching mold d2 but it has such a shape that a width of a distance P+Hd (FIG. 3) that is equal to the pitch P between the centers of the pins plus a pin hole diameter Hd. Thus the sides 118 and 120 are shaved beyond the junction where the straight sides merge with the semi-circular half arcs which form the perimeter of the end portions of the link.

The reason for the use of the plate shaving molds S2 of such a shape is that since in a link plate for a roller chain used in a timing drive system in an internal combustion engine, a tensioner lever and a guide lever come into sliding contact with end surfaces of link plates, smoothness of a pair of upper and lower straight line portions is important. On the other hand, since the portions on the right and left half arcs of the plate do not come into contact with another member particularly, expensive shaving is preferably avoided if possible.

Figures 4A, 4C:
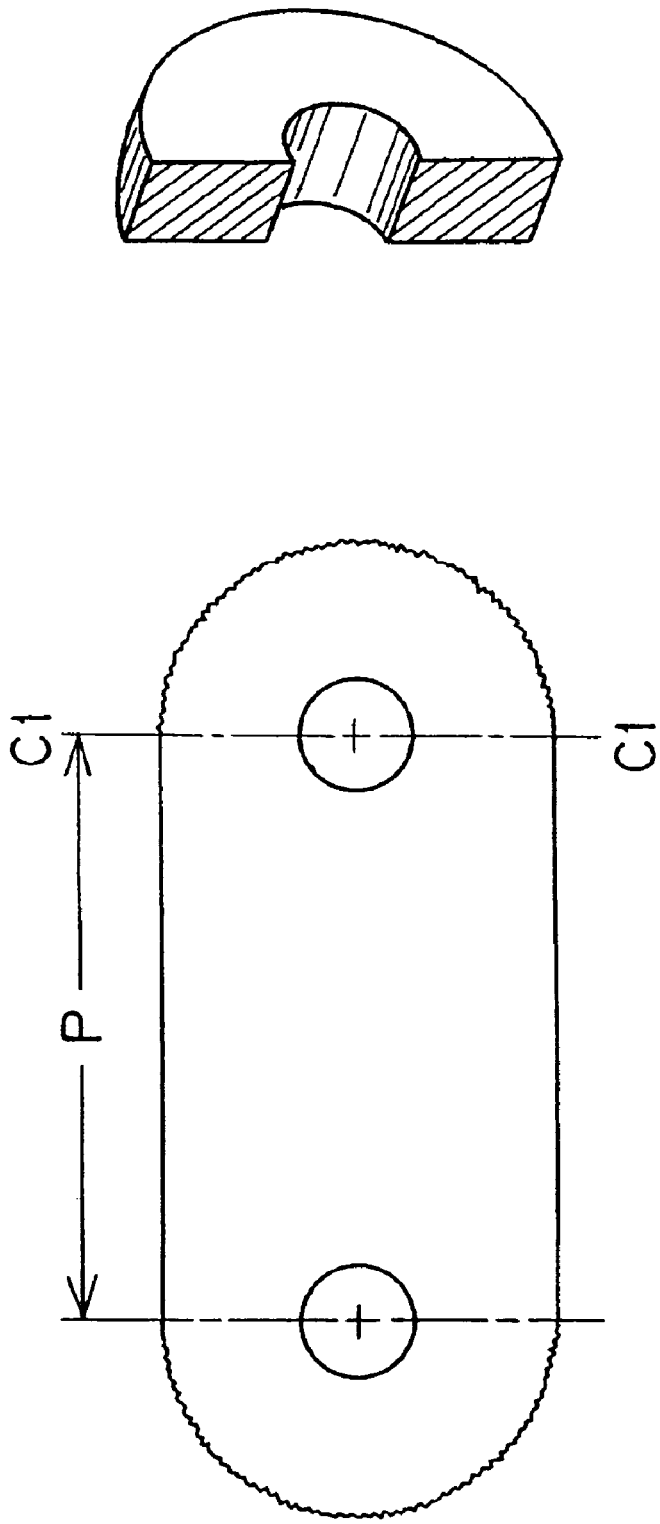
FIG. 4(*a*) shows a conventional link plate with semi-circular end portions and shaved sides between the ends of the half arcs forming the end portions.
Figure 5:
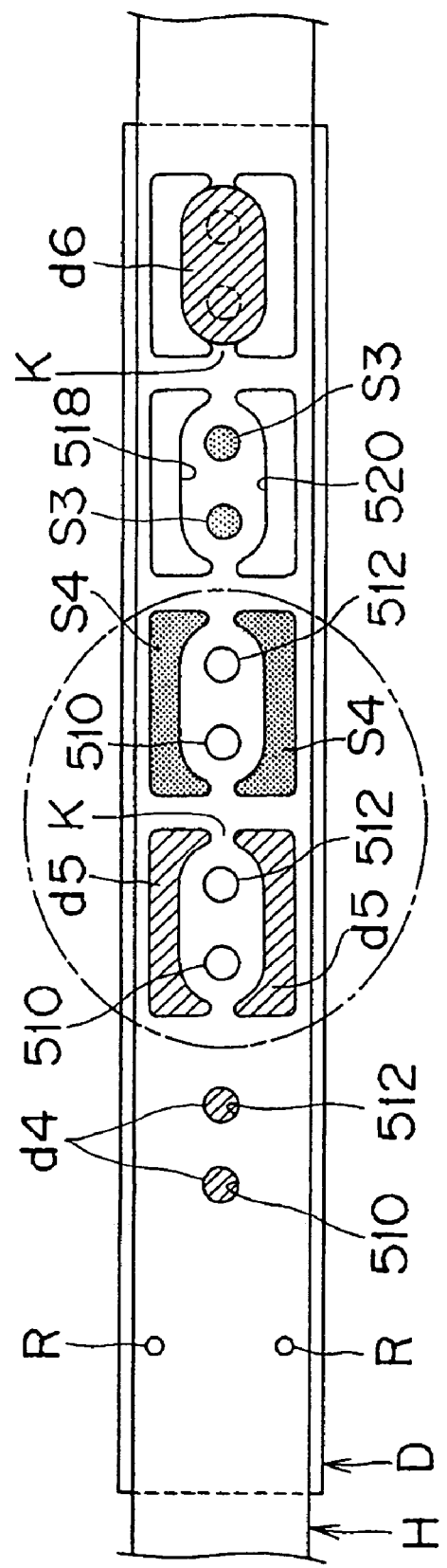
FIG. 5 is a view explaining a manufacturing method of the conventional example, using a costly shaving mold.
Figure 5:
Figure 5:
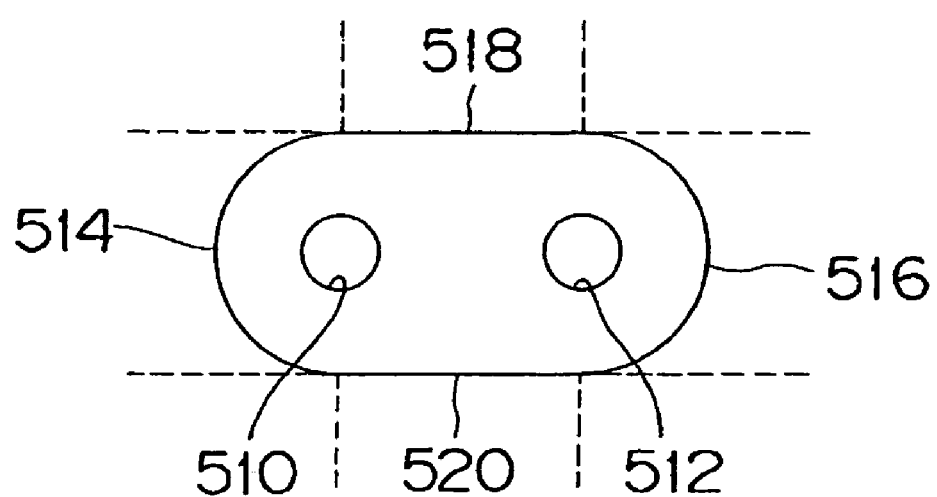
Figure 6:
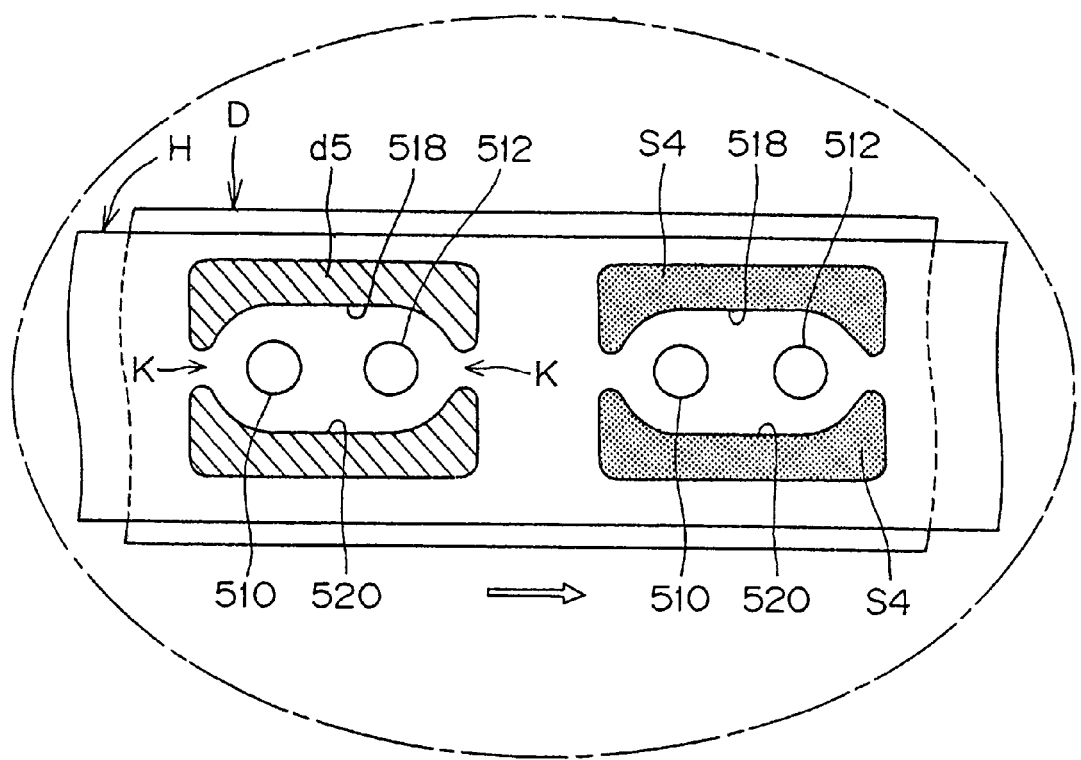
FIG. 6 is an enlarged view of a working region shown within the broken line VI in FIG. 5.
Figure 7:
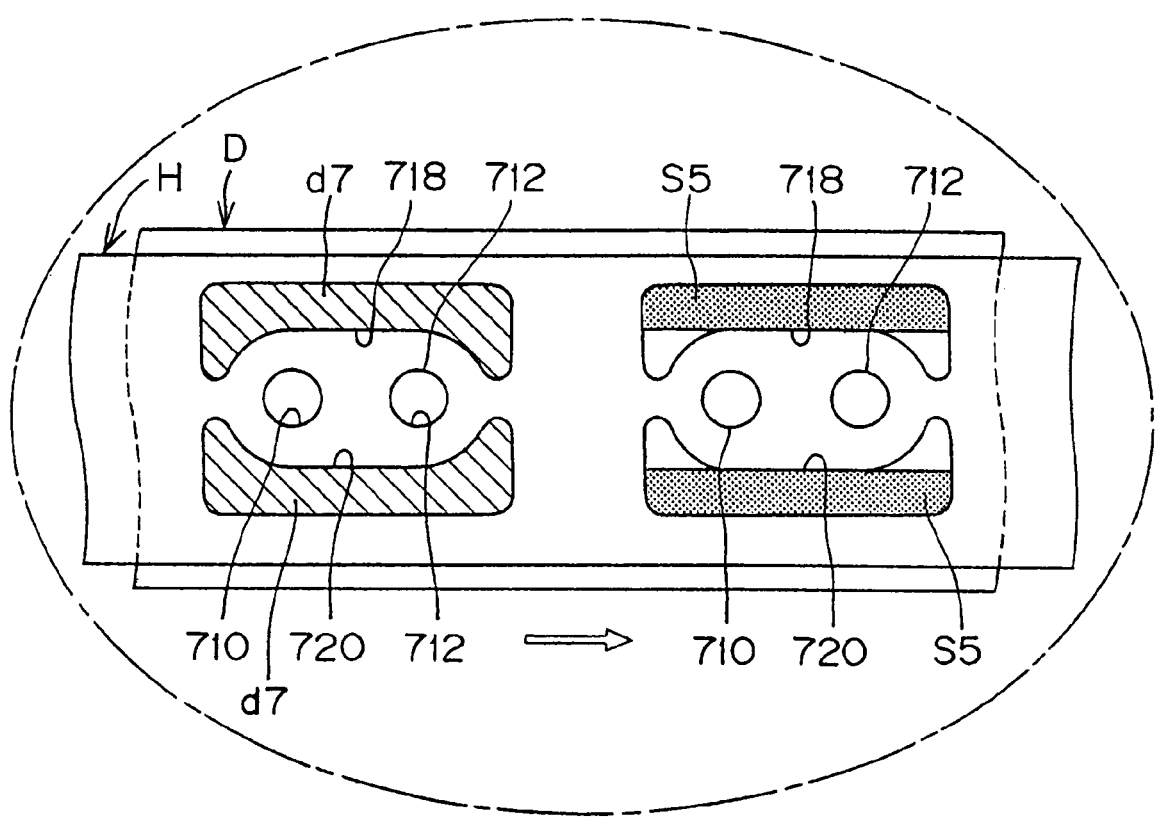
FIG. 7 is a view similar to FIG. 6 explaining another manufacturing method of a conventional example with a less costly shaving mold.
Figure 8:
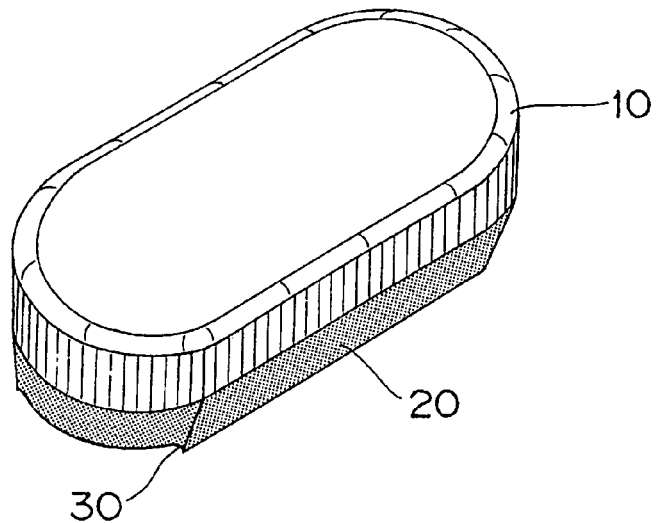
FIG. 8(*a*) is an explanatory perspective view of a blank which has been subjected to roughly punching.
Figure 8:
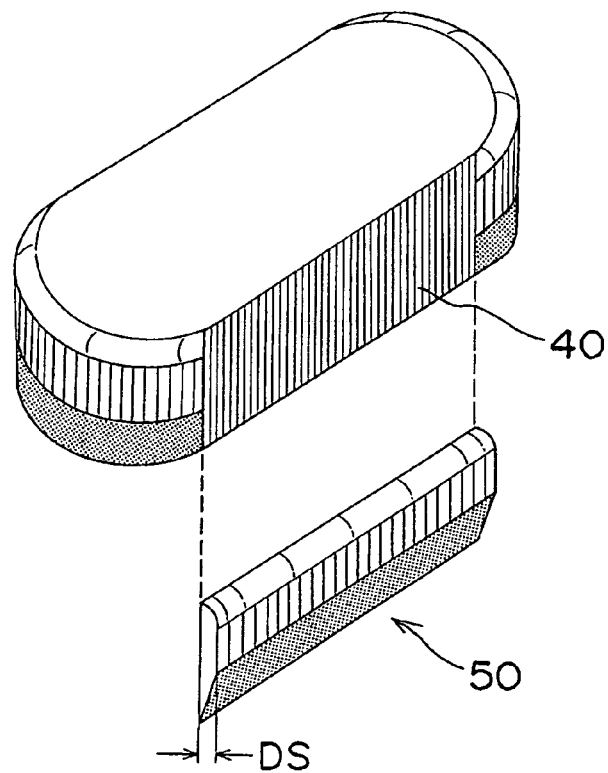

However, in a case where only a pair of upper and lower straight line portions of the link plate is shaved by the use of the plate shaving molds S5 as shown in FIG. 7, a boundary between a roughly punched portion (half arc portion) and shaved portions (straight line portions) corresponds to a boundary between straight line portions and a half arc portion, as shown in FIG. 4(*a*). Thus, since the line connecting the upper and lower boundary lines straddle a pin hole, the link plate obtained by roughly punching is liable to warp, resulting in a fact that the link plate is liable to break at a position shown by the C1-C1 line. The reason is that as apparent from the drawing depicting as a perspective view of a C1-C1 cross-section in FIG. 4(a), since the cross-sectional surface of the link plate straddles the pin hole, it has a small cross-sectional area.

Further, the present inventers have studied very hard and found that a step generated at a boundary between a shaved region and a roughly punched region is liable to become a starting position of fatigue failure. The shaving is performed to the outermost positions (P+Hd region shown in FIG. 4(b)) of both ends of pin holes in the link plate during shaving of end surfaces of the link plate so that a line connecting the shaved region and the roughly punched region does not straddle a pin hole, and preferably is tangential to the outermost sides of the pin holes. As a result the warp of the link plate is reduced and breaking of the link plate is suppressed. Namely, as shown in FIG. 4(b), the length of the shaved region is defined as the chain pitch interval P plus the diameter Hd of the pin holes formed in the link plate i.e., P+Hd. In this manner, since the cutting line does not straddle or pass through the pin hole, the extension of the working region makes the cross-sectional area of a cutting face large, as can be seen from FIG. 4(d) depicted as a perspective view of a C2-C2 cross-section.

Further, according to the present invention, since a deformation generated in the link plate can be decreased, a bending failure, which is generated by the interference between a warped link plate and the adjacent link plate, can be prevented. Further, the warp of the link plate, which is generated at the separation of a link plate from a band-shaped steel plate, is generated outside the outermost positions of both right and left ends of the pin holes, an aimed chain length can be obtained without affecting the pitch between pin holes bored in the link plate. Further, since an oblique contact between the pin and the bush is prevented, not only the wear elongation performance of the chain is improved but also the service lives of the bush and the roller are enhanced. Furthermore, since a uniform chain pitch can be obtained, the engagement between a sprocket and the chain becomes uniform so that irregular engagement noises can be reduced.

Although in the above-mentioned explanation, a link plate having pin holes that is an outer link plate has been explained, even a link plate into holes of which bushed are press-fit, that is an inner link plate can be also adapted. Alternatively, it is needless to say that even a bush chain having no rollers has the same effects as the roller chain.

INDUSTRIAL APPLICABILITY

The present invention is preferably used in a timing drive system in an internal combustion engine, which requires endurance, reliability, low noises and the like.

The invention claimed is:

1. A link plate for a roller chain obtained by shaving a peripheral portion of a roughly punched link plate roughly punched after intermittently, sequentially feeding a band-shaped steel plate to a series of link plate molds consisting of different working molds characterized in that said link plate has a shape comprising a pair of right and left pin holes, a pair of right and left half arcs, which are spaced outwardly from and concentric with said pin holes respectively, and a pair of upper and lower straight line portions connecting both ends of the pair of right and left half arcs, said half arcs having a partial rough surface including at least one of a sag, a rupture surface and a burr, said straight line portions having a shaved smooth surface terminating in first junctions between said straight line portion and said half arcs, and said shaved smooth surface extending along said pair of upper and lower straight line portions and into said half arcs beyond said first junction where the straight line portions merge with the half arcs to a second junction where the shaved smooth surface meets the end of said partial rough surface of the half arc, whereby said half arcs have a central rough surface extending between shaved smooth surfaces adjacent the ends of said half arcs, said second junctions which are between the rough surface and the smooth surfaces in each half arc being connected by an imaginary cord line which passes tangent to the outermost side of said pin hole which is concentric with said half arc.

2. A manufacturing method of a link plate for a roller chain comprising the steps of intermittently, sequentially feeding a band-shaped steel plate to a series of link plate molds consisting of different working molds, roughly punching said steel plate into a link plate to produce an outer periphery having a rough surface including at least one of a sag, a rupture surface and a burr, and shaving a portion of rough surface to produce a smooth shaved surface, characterized in that said link plate is obtained by said roughly punching into a shape comprising a pair of right and left pin holes, a pair of right and left half arcs, which are spaced outwardly from and concentric with said pin holes respectively, and a pair of upper and lower straight line portions connecting both ends of the pair of right and left half arcs, and having first junctions with said half arcs, said shaving in said link plate extending along the full length along said pair of upper and lower straight line portions and into parts of said half arcs beyond the outermost positions of both ends of said pin holes, said shaving terminating in second junctions which are located between the rough surface and the smooth surfaces in each half arc, said second junctions being connected by an imaginary cord line which passes tangent to the outermost side of said pin hole which is concentric with said half arc, whereby said half arcs have smooth surface portions at their ends and a rough surface in the middle between said smooth surface portions.

* * * * *